(12) United States Patent
Soehren (10) Patent No.: US 8,112,226 B2
(45) Date of Patent: Feb. 7, 2012

(54) TELEPHONE OR OTHER PORTABLE DEVICE WITH INERTIAL SENSOR

(75) Inventor: Wayne A. Soehren, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/730,778

(22) Filed: Mar. 24, 2010

(65) Prior Publication Data
US 2010/0174487 A1    Jul. 8, 2010

Related U.S. Application Data

(63) Continuation of application No. 10/973,503, filed on Oct. 26, 2004, now Pat. No. 7,706,977.

(51) Int. Cl.
*G01C 21/12* (2006.01)
*G06F 3/03* (2006.01)

(52) U.S. Cl. .................. 701/487; 463/36; 345/157

(58) Field of Classification Search .............. 701/217, 701/220
See application file for complete search history.

(56) References Cited

U.S. PATENT DOCUMENTS

| | | | |
|---|---|---|---|
| 4,584,646 A | 4/1986 | Chan et al. | |
| 4,829,304 A | 5/1989 | Baird | |
| 4,949,089 A | 8/1990 | Ruszkowski, Jr. | |
| 5,440,492 A | 8/1995 | Kozah et al. | |
| 5,528,518 A | 6/1996 | Bradshaw et al. | |
| 5,646,857 A | 7/1997 | McBurney et al. | |
| 5,774,829 A | 6/1998 | Cisneros et al. | |
| 5,912,643 A | 6/1999 | Chew et al. | |
| 6,032,108 A | 2/2000 | Seiple et al. | |
| 6,067,046 A | 5/2000 | Nichols | |
| 6,092,005 A | 7/2000 | Okada | |
| 6,122,960 A * | 9/2000 | Hutchings et al. | 73/493 |
| 6,124,826 A | 9/2000 | Garthwaite et al. | |
| 6,125,326 A | 9/2000 | Ohmura et al. | |
| 6,127,945 A | 10/2000 | Mura-Smith | |
| 6,132,391 A | 10/2000 | Onari et al. | |
| 6,218,980 B1 | 4/2001 | Goebel et al. | |
| 6,243,660 B1 * | 6/2001 | Hsu et al. | 702/160 |
| 6,246,960 B1 | 6/2001 | Lin | |
| 6,339,746 B1 | 1/2002 | Sugiyama et al. | |
| 6,362,778 B2 | 3/2002 | Neher | |
| 6,415,223 B1 | 7/2002 | Lin et al. | |

(Continued)

FOREIGN PATENT DOCUMENTS
DE    10129444 A1    1/2003
(Continued)

OTHER PUBLICATIONS

Margaria, "Biomechanics and Energetics of Muscular Exercise", 1976, pp. 107-124, Publisher: Oxford University Press, Published in: Oxford, United Kingdom.

(Continued)

*Primary Examiner* — Thomas Black
*Assistant Examiner* — Lin B Olsen
(74) *Attorney, Agent, or Firm* — Fogg & Powers LLC (57) ABSTRACT

At least one inertial sensor is configured to sense movement of a telephone (or other portable device such as a personal digital assistant, portable computer, portable game device, portable audio player, or portable video player). Information derived at least in part from data output by the inertial sensor is used as input to software executing on the telephone.

21 Claims, 5 Drawing Sheets

U.S. PATENT DOCUMENTS

| | | |
|---|---|---|
| 6,459,990 B1 | 10/2002 | McCall et al. |
| 6,512,976 B1 | 1/2003 | Sabatino et al. |
| 6,522,266 B1 | 2/2003 | Soehren et al. |
| 6,542,824 B1* | 4/2003 | Berstis ............... 701/220 |
| 6,546,336 B1 | 4/2003 | Matsuoka et al. |
| 6,590,526 B1 | 7/2003 | Grube et al. |
| 6,751,535 B2 | 6/2004 | Mori |
| 6,826,477 B2 | 11/2004 | Ladetto et al. |
| 6,882,308 B2 | 4/2005 | Farine et al. |
| 6,908,386 B2* | 6/2005 | Suzuki et al. ............ 463/30 |
| 6,975,959 B2* | 12/2005 | Dietrich et al. ........... 702/153 |
| 7,094,147 B2* | 8/2006 | Nakata et al. ............ 463/9 |
| 7,169,998 B2* | 1/2007 | Kondo et al. ............. 84/615 |
| 7,223,173 B2* | 5/2007 | Masuyama et al. ........ 463/36 |
| 7,292,867 B2 | 11/2007 | Werner et al. |
| 7,295,296 B1 | 11/2007 | Galli |
| 7,302,359 B2 | 11/2007 | McKitterick |
| 2002/0111737 A1 | 8/2002 | Hoisko |
| 2003/0092493 A1* | 5/2003 | Shimizu et al. ........... 463/43 |
| 2003/0114980 A1 | 6/2003 | Klausner et al. |
| 2003/0151506 A1 | 8/2003 | Luccketti |
| 2003/0158664 A1* | 8/2003 | Swope et al. ............. 701/214 |
| 2003/0182053 A1* | 9/2003 | Swope et al. ............. 701/207 |
| 2003/0182077 A1 | 9/2003 | Emord |
| 2004/0133346 A1 | 7/2004 | Bye et al. |
| 2004/0168515 A1* | 9/2004 | Lasalandra et al. ........ 73/510 |
| 2004/0181703 A1* | 9/2004 | Lilja et al. ............... 713/324 |
| 2004/0185822 A1* | 9/2004 | Tealdi et al. ............. 455/404.1 |
| 2005/0015199 A1 | 1/2005 | Lokshin et al. |
| 2005/0017454 A1* | 1/2005 | Endo et al. ............... 273/317.1 |
| 2005/0110676 A1 | 5/2005 | Heppe et al. |
| 2005/0136912 A1 | 6/2005 | Curatolo et al. |
| 2006/0075342 A1 | 4/2006 | Penning |
| 2006/0176294 A1* | 8/2006 | Vaananen ............... 345/419 |
| 2008/0048979 A1* | 2/2008 | Ruttenberg ............. 345/158 |
| 2008/0167861 A1* | 7/2008 | Inoue et al. ............. 704/206 |

FOREIGN PATENT DOCUMENTS

| | | |
|---|---|---|
| FR | 2788151 | 7/2000 |
| GB | 2298539 A | 9/1996 |
| GB | 2325975 | 9/1998 |
| GB | 2371962 | 8/2002 |
| JP | 59040116 | 3/1984 |
| JP | 7134641 | 5/1995 |
| JP | 7271505 | 10/1995 |
| WO | 03078929 | 9/2003 |

OTHER PUBLICATIONS

Karnick, "Low Cost Inertial Measuring Unit", 1992, pp. 422-425, Publisher: IEEE, Published in: US.

Harrison et al., "Squeeze Me, Hold Me, Tilt Me! An Exploration of Manipulative User Interfaces", "Proceedings of the SIGCHI Conference on Human Factors in Computing Systems", Apr. 18-23, 1998, pp. 17-24, Publisher: CHI '98, Published in: Los Angeles, CA.

Knight, Will, "Gyroscope gives cellphone 'tilt control'", "available at http://www.newscientist.com/article/dn3958-gyroscope-gives-cellphone-tilt-control.html?full=true&print=true accessed Mar. 25, 2011", Jul. 2003, pp. 1-2, Publisher: New Scientist.

Rekimoto, Jun, "Tilting Operations for Small Screen Interfaces (Tech Note)", "Proceedings of the 9th Annual ACM Symposium on User Interface Software and Technology", 1996, pp. 1-2, Publisher: UIST '96.

"Shake It Up, Baby", "www.newscientist.com", Oct. 12, 2002, p. 17 Publisher: NewScientist.

Thomas, Bruce H., "Challenges of Making Outdoor Augmented Reality Games Playable", "In the 2nd Crest Workshop on Advanced Computing and Communicating Techniques for Wearable Information Playing", May 2003, pp. 1-8, Published in: Nara, Japan.

* cited by examiner

TELEPHONE OR OTHER PORTABLE DEVICE WITH INERTIAL SENSOR

CROSS-REFERENCE TO RELATED APPLICATIONS

This application is a continuation of U.S. application Ser. No. 10/973,503, filed Oct. 26, 2004, which is incorporated herein by reference.

BACKGROUND

Navigation systems are typically used to provide information indicative of position and/or movement. For example, in one exemplary navigation system, one or more inertial sensors are used to generate information indicative of movement. Examples of such inertial sensors include gyroscopes and accelerometers. In one such navigation system, one or more magnetic sensors are also used to generate information indicative of direction. An example of such a magnetic sensor is a magnetometer. In one such navigation system, one or more barometric pressure sensors are also used to generate information indicative of altitude. The information generated by such sensors is processed to provide positional and/or movement information.

In one application, a navigation system is used to generate information indicative of the position and/or motion of a particular human. However, in applications where the sensors are subject to a wide and/or unpredictable range of human movements, the complexity of navigational algorithms and/or the quality of the sensors used in such an application typically must be increased in order to handle and/or compensate for such movements and still provide the desired navigational information. This can increase the cost and/or size of such a system.

SUMMARY

One embodiment is directed to a portable device comprising at least one inertial sensor configured to sense movement of the portable device and at least one programmable processor configured to execute software. The at least one programmable processor is communicatively coupled to the inertial sensor. The software is configured to use information derived at least in part from data output by the inertial sensor related to the movement of the portable device.

Another embodiment is directed to a method that comprises sensing movement of a portable device at least in part using an inertial sensor and providing information derived at least in part from sensor data output by the inertial sensor to at least one programmable processor included in the portable device. The method further comprising using at least some of the information provided to the programmable processor as an input to software executing on the programmable processor included in the portable device.

DRAWINGS

Like reference numbers and designations in the various drawings indicate like elements.

DETAILED DESCRIPTION

Figure 1:
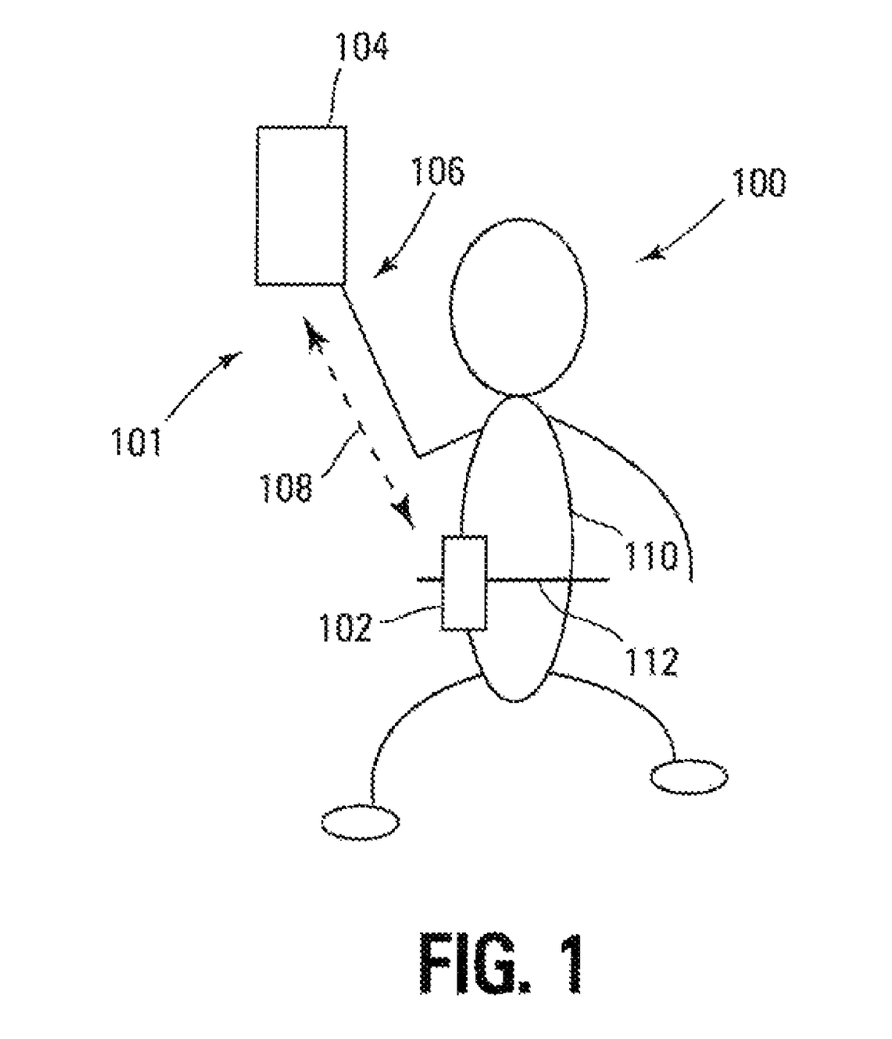
FIG. 1 is a schematic diagram of one usage scenario of a human using a navigation unit and a portable digital device.

FIG. 1 is a schematic diagram of a human 100 (also referred to here as the "user" 100) using an embodiment of system 101 that includes a navigation unit 102 and a portable device 104. FIG. 1 illustrates one usage scenario for the navigation unit 102. As used herein, a "portable device 104" is a device that is typically held in a hand 106 of the user 100 when the user 100 uses or otherwise interacts with the portable device 104. Examples of portable devices 104 include a mobile telephone, two-way radio, palmtop computer, personal digital assistant, music and/or video player (for example, a MP3, CD, or DVD player), and hand-held game device. In the embodiment shown in FIG. 1, the navigation unit 102 and the portable device 104 communicate with one another over a wireless communication link 108. The communication between the navigation unit 102 and the portable device 104 over the wireless communication link 108 occurs when the navigation unit 102 and the portable device 104 are both used by the user 100. That is, such communication occurs when the navigation unit 102 and the portable device 104 are physically close to each other.

In the usage scenario shown in FIG. 1, the navigation unit 102 is attached to the torso 110 of the user 100. For example, as shown in FIG. 1, the navigation unit 102 is attached to a belt 112 worn by the user 100. In one implementation, the navigation unit 102 (or a carrying case (not shown) for the navigation unit 102) includes a clip or other attachment mechanism that allows the navigation unit 102 to be removably attached to the belt 112.

Such an embodiment is suitable for use, for example, in applications where it is desirable to monitor the movement of the user 100. The portable device 104 is typically subject to a wide and/or unpredictable range of movements. By separating the navigation unit 102 from the portable device 104 and mounting the navigation unit 102 on the torso 110 of the user 100, the navigation unit 102 need not be designed to handle and/or compensate for such a wide and/or unpredictable range of movements of the portable device 104 in order to monitor the movement of the user 100. Thus, smaller, less expensive and/or less complex sensors and/or algorithms can be used in the navigation unit 102 in such an embodiment. The use of such sensors and/or algorithms can reduce the cost, complexity, and/or size of the navigation unit 102.

Moreover, though the device 104 is shown in FIG. 1 being held in the hand 106 of the user 100, it is to be understood that the portable device 104 is not always held in the user's hand 106. For example, in the embodiment shown in FIG. 1, the user 100 can attach the portable device 104 to the belt 112 of the user 100 when the user 100 is not holding the portable device 104 in one of the user's hands 106. The portable device 104 (or a carrying case (not shown) for the portable device 104) in such an embodiment includes a belt clip (not shown) or other attachment mechanism that is used to removably attach the portable device 104 to the belt 112. The portable device 104 is removed from the belt 112 when the user 100 wishes to actively interact with the portable device 104. For example, where the portable device 104 comprises a mobile telephone, the mobile telephone is removed from the belt 112 when the user 100 wishes to engage in a telephone call using the mobile telephone.

Figure 2:
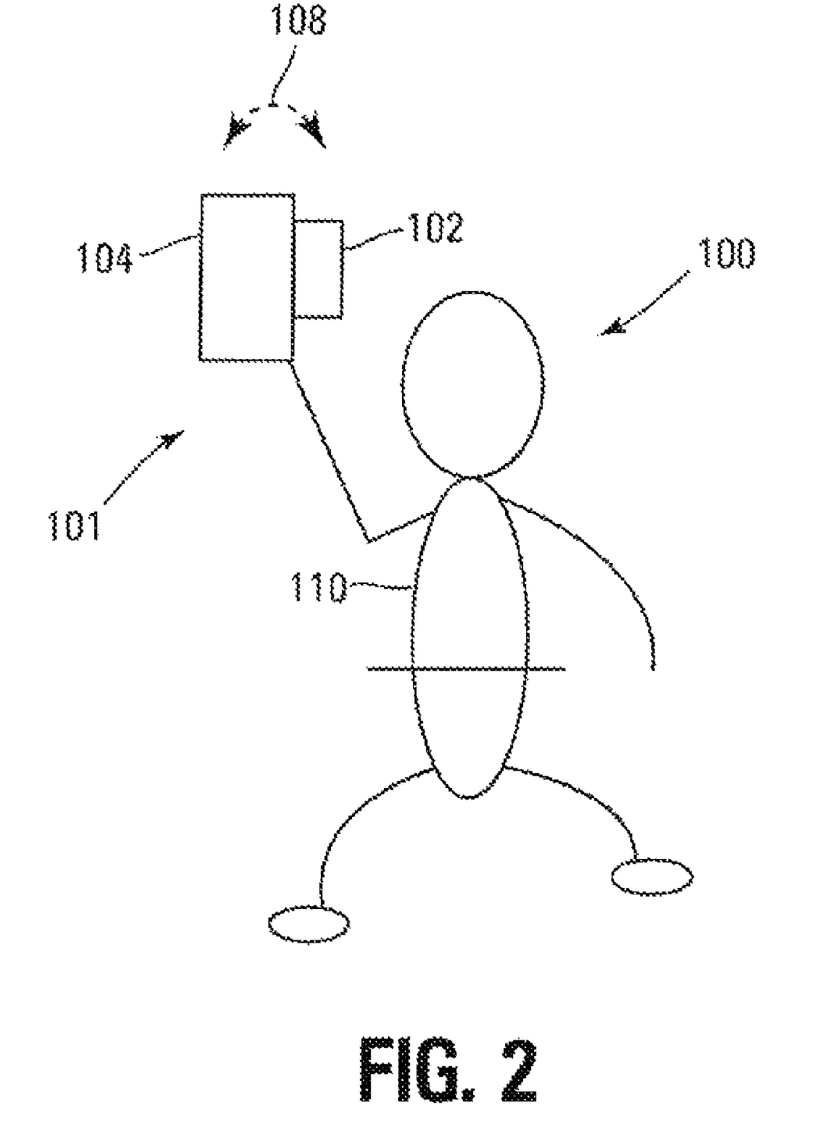
FIG. 2 is a schematic diagram of another usage scenario of a human using a navigation unit and a portable digital device.

FIG. 2 is a schematic diagram of another usage scenario for the navigation unit 102. The navigation unit 102 in this usage scenario is physically coupled to the portable device 104. For example, in one implementation, the navigation unit 102 is removably coupled to the portable device 104 using a clip or other attachment mechanism that allows the navigation unit 102 to be physically attached to the portable unit 104 so that the navigation unit 102 and the portable device 104 can be held and moved by the user 100 together.

Such an embodiment is suitable for use, for example, in applications where it is desirable to monitor the movement of the portable device 104 as opposed to the user 100. For example, in one such application, the navigation unit 102 and the portable device 104 act as an input device for a video game (for example, where the portable device 104 and navigation unit 102 are moved like a steering wheel of an automobile or like a joystick). In another application, the navigation unit 102 and the portable device 104 act as an input device for a user interface executing on the portable device 104 (for example, where the portable device 104 and the navigation unit 102 are used as a pointing device such as a mouse). In the embodiment shown in FIG. 2, the navigation unit 102 and the portable device 104 communicate with one another over a wireless communication link 108, as is done in the usage scenario shown in FIG. 1.

In applications where the navigation unit 102 need only identify a finite number of gestures or movements and/or with only a relatively modest degree of accuracy, smaller, less expensive and/or less complex sensors and/or algorithms (for example, the same sensors and/or algorithms that are suitable for use in the usage scenario shown in FIG. 1) can be used in the navigation unit 102. The use of such sensors and/or algorithms can reduce the cost, complexity, and/or size of the navigation unit 102.

In the usage scenario shown in FIG. 2, the navigation unit 102 can be removed from the portable device 104 and, for example, mounted to the torso 110 of the user 100 as shown in FIG. 1 in order to monitor the movement of the user 100 as opposed to the portable device 104. Likewise, in the usage scenario shown in FIG. 1, the navigation unit 102 can be removed from the torso 110 of the user 100 and, for example, mounted to the portable device 104 as shown in FIG. 2 in order to monitor the movement of the portable device 104.

Figure 3:
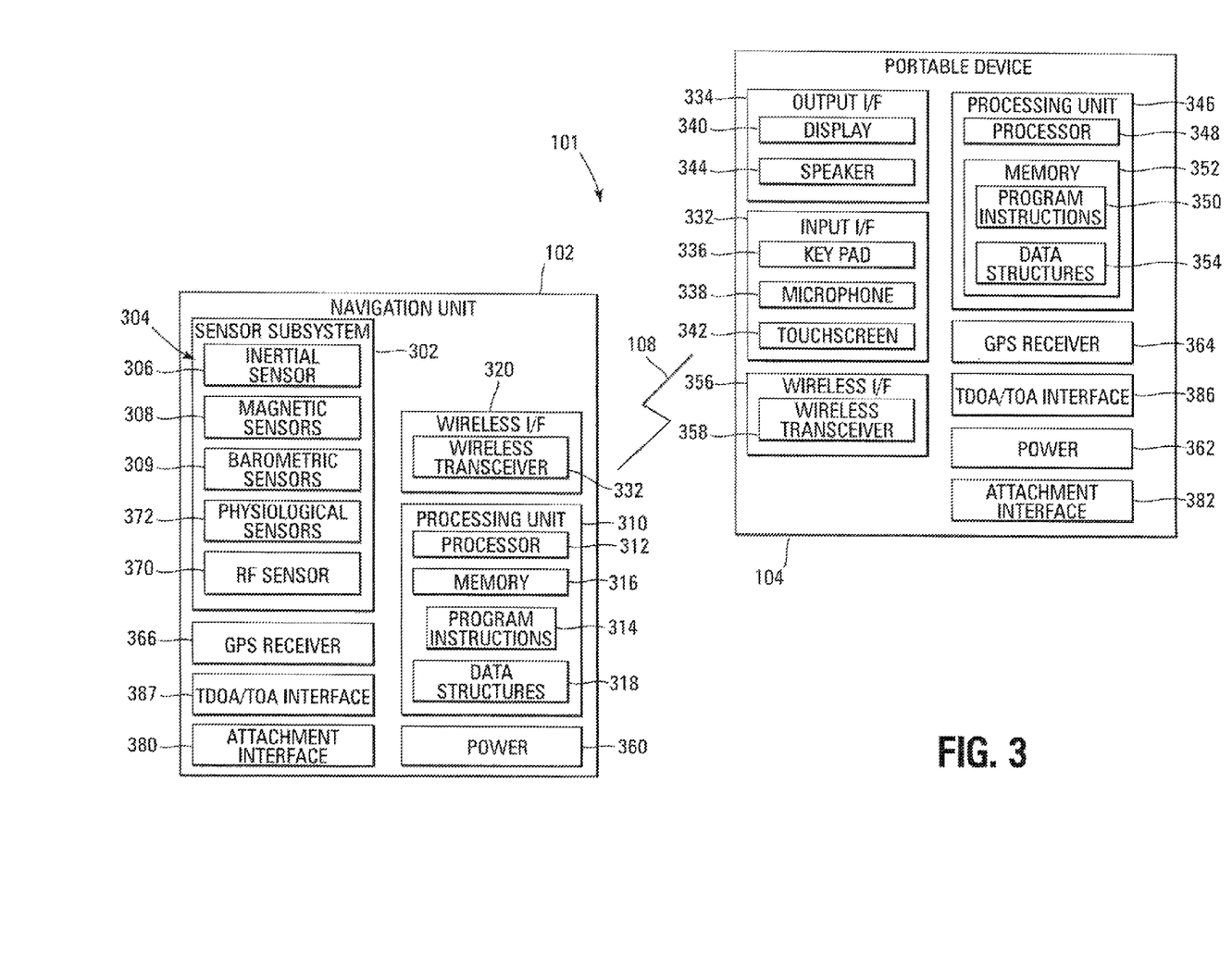
FIG. 3 is a block diagram of one embodiment of the system shown in FIG. 1.

FIG. 3 is a block diagram of one embodiment of the system 101 shown in FIG. 1. The navigation unit 102 includes a sensor subsystem 302 that includes one or more sensors 304. The sensors 304 generate information (for example, in the form of one or more analog signals or one or more digital data streams) that are indicative of a position and/or movement of the navigation unit 102. In the embodiment shown in FIG. 3, the sensors 304 include one or more inertial sensors 306, one or more magnetic sensors 308, and/or one or more barometric pressure sensors 309. In one implementation of such an embodiment, one or more of the sensors 304 are implemented using micro-electro-mechanical systems (MEMS) sensors. The data output by the sensors 304 are processed by a processing unit 310. In the embodiment shown in FIG. 3, the processing unit 310 is implemented using at least one programmable processor 312 (for example, at least one microprocessor) that is programmed with suitable program instructions 314. In such an embodiment, the processing unit 310 includes a memory 316 (for example, any suitable form of volatile memory and/or non-volatile memory) for storing such program instructions 314 and/or data structures 318 used during execution of the program instructions 314.

In the embodiment of system 101 shown in FIG. 3, the navigation unit 102 also includes a wireless interface 320. The wireless interface 320 is coupled to the processing unit 310 and is used by the processing unit 310 to communicate with the portable device 104 over the communication link 108. In one embodiment, the wireless communication link 108 is implemented using a low-power, short-range wireless communication link that makes use of, for example, BLUETOOTH® wireless technology. In such an embodiment, the wireless interface 320 includes a suitable BLUETOOTH wireless transceiver 322 that sends and receives data over the wireless communication link 108. In other embodiments, other types of wireless communication links 108 are used.

In the embodiment of system 101 shown in FIG. 3, the navigation unit 102 also includes an attachment interface 380. In one implementation, the attachment interface 380 comprises a clip or other attachment mechanism that is used to attach the navigation unit 102 to the user 100 (or to an item of clothing worn by the user such as a belt) and/or to the portable device 104. In other embodiments, the navigation unit 102 does not include the attachment interface 380 and instead the navigation unit 102 is put into a carrying case (not shown) that includes an attachment interface.

An exemplary embodiment of a portable device 104 is also shown in FIG. 3. The portable device 104 shown in FIG. 3 includes an input interface 332 and an output interface 334. The particular type of input interface 332 and output interface 334 used in the portable device 104 varies depending on the particular type of portable device 104 that is used. For example, where the portable device 104 comprises a mobile telephone, the input interface 332 includes a keypad 336 on which a user 100 is able to press various keys to input alphanumeric data. Also, in such a mobile telephone embodiment, the input interface 332 also includes a microphone 338 into which sound input is supplied to the portable device 104. In one implementation, a user speaks various voice commands that are recognized by the portable device 104.

In such a mobile telephone embodiment, the output interface 334 includes a display 340 (for example, a liquid crystal display (LCD)) on which information is displayed for the user 100. In one implementation of such an embodiment, a user interface is displayed on the display 340 in order to display information for the user and to prompt the user to supply certain inputs. In some embodiments (for example, where the portable device 104 comprises a personal digital assistant (PDA) or palmtop computer), the input interface 332 includes a touch screen 342 that is coupled to the display 340 of the output interface 334 (for example, by being overlaid on the display 340). Also, in a mobile telephone embodiment, the output interface 334 includes a speaker 344 that generates audio signals for the user 100 to hear. For example, in one implementation of such an embodiment, information is provided to the user 100 (or the user 100 is prompted to supply input) by playing, for example, a voice on the speaker 344 for the user 100.

A processing unit 346 is included in the portable device 104. The processing unit 346 is used to control and/or implement at least a portion of the functionality described here as being performed by the portable device 104. In the embodiment shown in FIG. 3, the processing unit 346 is implemented using at least one programmable processor 348 (for example, at least one microprocessor) that is programmed with suitable program instructions 350. In such an embodiment, the processing unit 346 of the portable device 104 includes a memory 352 (for example, any suitable form of volatile memory and/or non-volatile memory) for storing such program instructions 350 and/or data structures 354 used during execution of the program instructions 350.

The portable device 104 also includes a wireless interface 356. The wireless interface 356 is coupled to the processing unit 346 of the portable device 104 and is used by the processing unit 346 to communicate with the navigation unit 102 over the communication link 108. In one embodiment where the wireless communication link 108 is implemented using BLUETOOTH® wireless technology, the wireless interface 356 includes a suitable BLUETOOTH wireless transceiver 358 that sends and receives data over the wireless communication link 108. In other embodiments, other types of wireless communication links 108 are used.

In the embodiment of system 101 shown in FIG. 3, the portable device 104 also includes an attachment interface 382. In one implementation, the attachment interface 382 comprises a clip or other attachment mechanism that is used to attach the portable device 104 to the user 100 (or to an item of clothing worn by the user such as a belt) and/or to the navigation unit 102. In other embodiments, the portable device 104 does not include the attachment interface 382 and instead the portable device 104 is put into a carrying case (not shown) that includes an attachment interface. For example in one embodiment, the navigation unit 102 is incorporated into a "holster" or other carrying case for the portable device 104. When the user 100 is not actively using the portable device 104, the user 100 inserts the portable device 104 into the holster that contains the navigation unit 102.

In the embodiment shown in FIG. 3, each of the navigation unit 102 and the portable device 104 include separate power sources 360 and 362, respectively. For example, in such an embodiment, each of the power sources 360 and 362 comprises one or more batteries. In other embodiments, power sources 360 and/or 362 comprise other types of power sources. By including a separate power source 360 in the navigation unit 102, the navigation unit 102 need not be provided power from another source external to the navigation unit 102 (for example, from the portable device 104).

In the embodiment shown in FIG. 3, in addition to inertial sensors 306, magnetic sensors 308 and barometric pressure sensors 309, other mechanisms are used to obtain navigation-related information. In particular, in the embodiment shown in FIG. 3, the sensors 304 include a radio frequency (RF) sensor 370. The RF sensor 370 detects whether a radio frequency transponder (not shown) is within a detection range of the RF sensor 370. In one implementation, the RF sensor 370 comprises a RF transponder reader that, when a RF transponder (not shown) is placed within the detection range of the RF transponder reader, receives information from the RF transponder. In such an implementation, the information that is received from the RF transponder includes information that is associated with a particular geographic location. The information received from such a RF transponder is processed by the processing unit 310 to determine a geographic position estimate. Such a geographic position estimate is then used in the navigation-related processing performed by the processing unit 310 (for example, to control the navigation error growth).

For example, in one application a particular RF transponder is located at a specific geographic location (for example, a room within a building). When the navigation unit 102 is positioned so that the RF transponder is within the detection range of the RF sensor 370, the RF transponder communicates information from the RF transponder to the RF sensor 370. In one implementation, the information that is communicated from the RF transponder to the RF sensor 370 includes the geographic position of the RF transponder. That is, information directly identifying the geographic position of the RF transponder is encoded into the information communicated from the RF transponder to the RF sensor 370. In another implementation, the information that is communicated from the RF transponder to the RF sensor 370 includes a serial number or other identifier of the RF transponder. The processing unit 310, in such an implementation, is able to associate that serial number with a particular geographic location (for example, by using a look-up table or other data structure 318 stored in memory 316). In such implementations, the processing unit 310 concludes that the navigation unit 102 is near the geographic position associated with that RF transponder.

Also, in the embodiment shown in FIG. 3, the navigation unit 102 uses global position system (GPS) information in the navigation-related processing performed by the processing unit 310. In the embodiment shown in FIG. 3, the navigation unit 102 and/or the portable device 104 includes a GPS receiver. For example, the portable device 104, in one embodiment, includes a GPS receiver 364 that is used to receive signals transmitted by GPS satellites (typically, from at least four GPS satellites). In operation, the distance from each of the GPS satellites to the GPS receiver 364 is determined by estimating the amount of time it takes each signal transmitted by each of the GPS satellites to reach the GPS receiver 364. The distance estimates are then used to calculate the position of the GPS receiver 364. In one such embodiment, such GPS information is communicated from the portable device 104 to the navigation unit 102 over the wireless communication link 108. The GPS information is received by the navigation unit 102 from the portable device 104 and is used by the processing unit 310 in the navigation-related processing performed by the processing unit 310. For example, the processing unit 310 in one embodiment uses the GPS information to control navigation error growth.

In another embodiment, the navigation unit 102 includes a GPS receiver 366 within the navigation unit 102 itself instead of, or in addition to, the GPS receiver 364 within the portable device 102. In such an embodiment, the GPS information generated by the GPS receiver 366 is used by the processing unit 310 in the navigation-related processing performed by the processing unit 310. For example, the processing unit 310 in one embodiment uses the GPS information to control navigation error growth.

Also, in the embodiment shown in FIG. 3, the navigation unit 102 uses time difference of arrival (TDOA) or time of arrival (TOA) information in the navigation-related processing performed by the processing unit 310. In the embodiment shown in FIG. 3, the portable device 104 includes a TDOA/TOA interface 386 by which the portable device 104 receives a TDOA or TOA position estimate. In operation, the portable device 104 transmits data to two or more base stations (for example, using a transceiver (not shown) included in the TDOA/TOA interface 386). The base stations determine, in this example, a position estimate for the portable device 104 based on the differences in the time at which such transmission arrive at each of the base stations. The position estimate is communicated to the portable device 104 and the portable device 104 communicates the received TDOA position estimate to the navigation unit 102 over the wireless communication link 108. The TDOA position estimate is received by the navigation unit 102 from the portable device 104 and is used by the processing unit 310 in the navigation-related processing performed by the processing unit 310. For example, the processing unit 310 in one embodiment uses the TDOA position estimate to control navigation error growth. In other implementations, TOA techniques are used in addition to or instead of TDOA techniques to generate a position estimate.

Moreover, as shown in FIG. 3, the navigation unit 102 can include a TDOA/TOA interface 387 in addition to, or instead of, the TDOA/TOA interface 386 included in the personal device 104. The TDOA/TOA interface 387 is used to generate a TDOA or TOA position estimate as described above in connection with the TDOA/TOA interface 386. In one implementation, the RF sensor 370 is implemented as a TDOA/TOA sensor for use with or in the TDOA/TOA interface 387. Such a position estimate is then used by the processing unit 310 in the navigation-related processing performed by the processing unit 310.

In another implementation, the TDOA/TOA interface 387 is used to generate individual TDOA or TOA range and/or range rate estimates to individual TDOA/TOA base station(s) as described above in connection with the TDOA/TOA interface 386. The range and/or range rate estimate(s) are then used by the processing unit 310 in the navigation-related processing performed by the processing unit 310. This implementation allows useful navigation data to be derived from the TDOA/TOA even when a complete position estimate cannot be performed by the TDOA/TOA due to lack of base station coverage.

In one exemplary embodiment, the sensors 304 are used to determine a position of the user 100 of the system 101. In such an embodiment, inertial sensors 306 are used to determine a first position estimate. The sensors 304 and/or the GPS receiver 364 or 366 are also used to determine a second position estimate and/or an estimate of distance traveled by the user 100. The second position estimate and/or distance traveled estimate are used to determine corrections to the first position estimate.

For example, in one implementation of such an exemplary embodiment, the processing unit 310 generates the first position estimate from signals output from inertial sensors 306. In such an implementation, the inertial sensors 306 include an arrangement of three accelerometers and three gyroscopes that are used to generate the first position estimate. Accelerometers are inertial sensors 306 that sense a linear change in rate (that is, acceleration) along a given axis. Gyroscopes are inertial sensors 306 that sense angular rate (that is, rotational velocity). The three accelerometers are oriented around three mutually orthogonal axes (the x, y, and z axes) and the three gyroscopes are oriented around three mutually orthogonal axes (pitch, yaw, and roll axes). The outputs of the accelerometers and the gyroscopes are processed by the processing unit 310 (for example, using program instructions 314 executing on the programmable processor 312 of the processing unit 310). For example, the three orthogonal outputs of the accelerometers are vectorily summed by the processing unit 310 to obtain an acceleration vector for the navigation unit 102. The processing unit 310 integrates the acceleration vector to obtain a velocity vector for the navigation unit 102 and then integrates the velocity vector to obtain a position vector for the navigation unit 102. The three orthogonal outputs of the gyroscopes are vectorily summed by the processing unit 310 to obtain a rotational velocity vector for the navigation unit 102. The processing unit 310 integrates the rotational velocity vector to obtain the attitude of the navigational unit 102. The position vector and the attitude are used to generate the first position estimate. In another implementation, a second position estimate of altitude is generated using the barometric pressure sensor 309.

In one implementation of such an exemplary embodiment, the processing unit 310 generates the second position estimate and/or distance traveled estimate using a motion classifier and one or more motion models. In such an implementation, the motion classifier and motion models are implemented, for example, in software using appropriate program instructions 314 executing on the programmable processor 312 of the processing unit 310. The motion classifier and motion models are used to generate the second position estimate and/or distance traveled estimate from the signals output by the sensors 304. In another implementation, the second position estimate and/or distance traveled estimate is generated using dead reckoning techniques, GPS information, TDOA information, and/or information received from one or more RF transponders.

In one implementation of such an exemplary embodiment, the processing unit 310 generates the corrections to the first position estimate using a Kalman filter. In such an implementation, the Kalman filter is implemented, for example, in software using appropriate program instructions executing on the programmable processor 312 of the processing unit 310. The Kalman filter receives the first position estimate and the second position estimate and/or distance traveled estimate and generates corrective feedback for the first position estimate.

Such an exemplary embodiment is described in U.S. Pat. No. 6,522,266, entitled "Navigation System, Method and Software for Foot Travel," (referred to here as the "'266 Patent"). The '266 Patent is hereby incorporated herein by reference.

In another exemplary embodiment, the navigation unit 102 is used to sense and measure the motion of the user 100 to which the navigation unit 102 is attached. The navigation unit 102 classifies the motion of the user 100 and determines the amount of energy expended by the user 100 as a result of the motion. The sensors 304 include sensors (for example, sensors 306 and 308) for measuring position and/or distance traveled. In such an embodiment, the sensors 304 also include at least one physiological sensor 372 that senses or measures information indicative of at least one physiological attribute of the user 100 such as respiration rate, heart rate, hydration level, and/or blood oxygen level before, during, and/or after such motion. Such an exemplary embodiment is described in co-pending U.S. patent application Ser. No. 10/634,931, entitled "Human Motion Identification and Measurement System and Method" and filed on Aug. 5, 2003 (the "'931 Application"). The '931 Application is hereby incorporated herein by reference.

Figure 4:
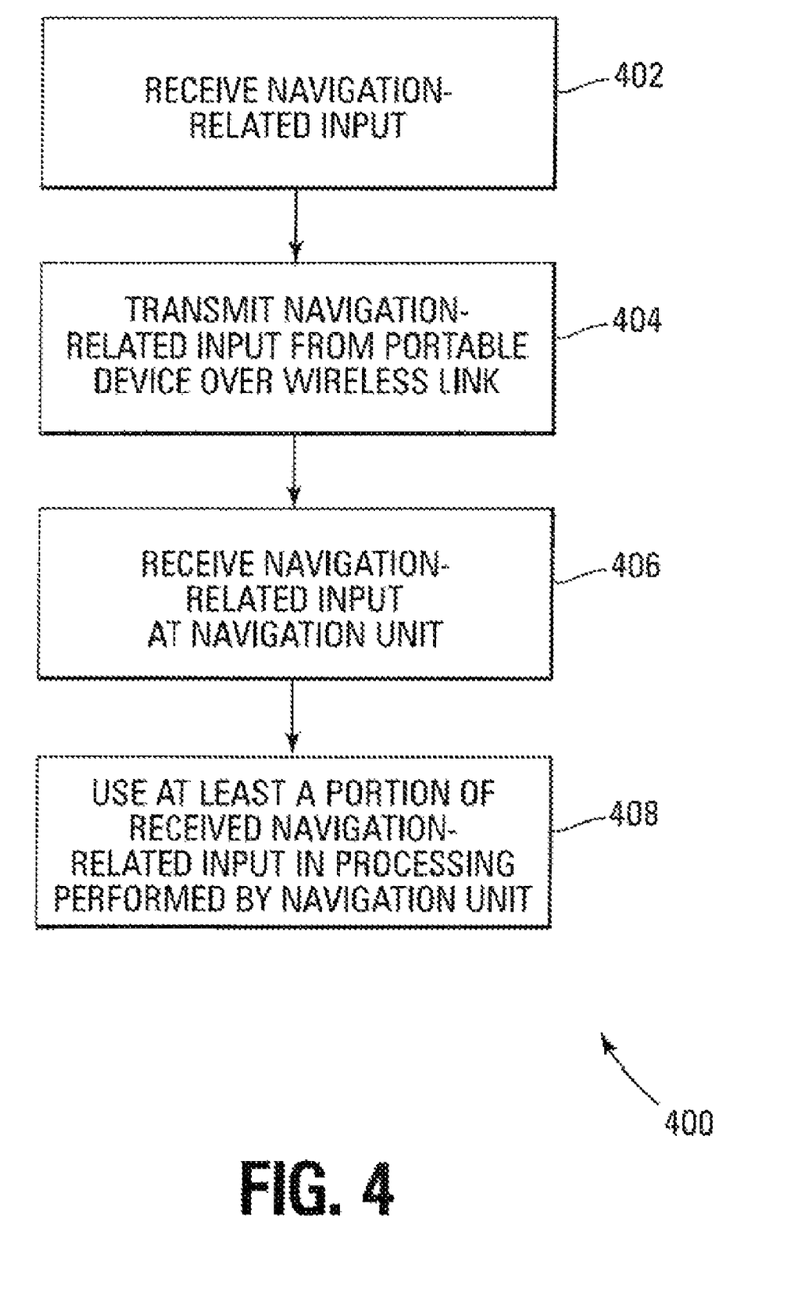
FIG. 4 is a flow diagram of one embodiment of a method of communicating data between a navigation unit and a portable device.

FIG. 4 is a flow diagram of one embodiment of a method 400 of communicating data between a navigation unit and a portable device. The embodiment shown in FIG. 4 is described here as being implemented using the system 101 shown in FIGS. 1-3, though other embodiments are implemented in other ways (for example, using other navigation units and/or portable devices).

Method 400 includes receiving an input for the navigation unit 102 (referred to here as "navigation-related input") at the portable device 104 (block 402). One example of a navigation-related input is input that is supplied to the portable device 104 by the user 100 via the input interface 332 of the portable device 104. For example, in an embodiment where the portable device 104 comprises a mobile telephone, a user uses a keypad 336 to enter the navigation-related input on the keypad 336 and/or speaks a voice command into a microphone 338 that is recognized, for example, by voice recognition software executing on the processing unit 346 of the portable device 104. In other embodiments, the navigation-related input is supplied using other parts of the input interface 332.

In some situations, the portable device 104, via the output interface 344, prompts the user 100 to supply such navigation-related input. For example, in one embodiment, the portable device 104 prompts the user 100 by displaying a prompt on a display 340 (for example, as a part of a user interface). In another embodiment, the portable device 104 prompts the user 100 by playing an audible cue on a speaker 344 (for example, by playing a voice instructing the user 100 to supply a certain type of navigation-related input). In other situations, the user 100 supplies the navigation-related input to the portable device 100 without first being prompted by the portable device 104. For example, in one such situation, the user 100 provides a system command to the navigation unit 102 (for example, to change some operational aspect of the navigation unit 102).

One type of navigation-related input includes system or other types of commands that modify the operation of the navigation unit 102. For example, in one embodiment, the user 100 causes the navigation unit 102 to power on or power off by entering a power on or power off command, respectively.

Another type of navigation-related input includes navigation information that is used in the navigation processing performed by the navigation unit 102. For example, in an embodiment where the navigation unit 102 performs dead reckoning navigation processing, the user 100 supplies an input that is indicative of a known starting position of the user 100 that serves as the basis for the dead reckoning processing performed by the navigation unit 102.

Another type of navigation-related input includes information about the user 100. For example, in an embodiment where the navigation unit 102 estimates an amount of energy expended by the user 100 in performing some motion such as walking, the user 100 enters the user's weight and age, which are used by the processing unit 310 in such an embodiment to estimate the amount of energy expended by the user 100 in performing the motion. Another example of such navigation-related input includes an average stride length for the user 100 that is used in dead reckoning navigation processing performed by the navigation unit 102.

Another type of navigation-related input is GPS information that is received by a GPS receiver 364 of the portable device 104. For example, in one embodiment, the GPS receiver 364 of the portable device 104 receive signals transmitted by four GPS satellites. The distance from each of the GPS satellites to the GPS receiver 364 is determined by estimating the amount of time it takes each signal transmitted by each of the GPS satellites to reach the GPS receiver 364. The distance estimates are then used to calculate the position of the GPS receiver 364. This GPS position information is then communicated to the navigation unit 102 as described below.

Another type of navigation-related input is TDOA information that is received by a TDOA interface 386 of the portable device 104. For example in one embodiment, the TDOA information includes a TDOA position estimate determined based on the time difference of arrival of a transmission from the portable device 104 to multiple base stations. The TDOA information is then communicated to the navigation unit 102 as described below.

Method 400 also includes transmitting the navigation-related input from the portable device 104 to the navigation unit 102 over the wireless communication link 108 (block 404). The navigation-related input is received by the navigation unit 102 (block 406). For example, the navigation-related input is transmitted by the wireless transceiver 358 of portable device 104 to the wireless transceiver 322 of the navigation unit 102 over the wireless communication link 108 using BLUETOOTH technology. The transmitted navigation-related input is received by the wireless transceiver 322 in the navigation unit 102 and is supplied to the processing unit 310 for use thereby. In other embodiments, other wireless communication technology is used.

In one embodiment, the navigation-related input is checked for errors and/or other conditions by the portable device 104 prior to communicating the navigation-related input to the navigation unit 102. For example, where a user 100 supplies navigation-related input to the portable device 104 using the input interface 332 (for example, by entering such input using keypad 336), if the user 100 makes a data entry error (for example, by entering alphabetic data where numeric data is expected or required), an error message is displayed for the user 100 via the output interface 334 (for example, by displaying such a message on the display 340) prompting the user 100 to supply corrected input. In this way, navigation-related input containing an error need not be communicated between the portable device 104 and the navigation unit 102. As a result, the navigation unit 102 need not perform the checking performed by the portable device 104.

In other embodiments, such checking is performed by the navigation unit 102 after the navigation-related input has been communicated from the portable device 104 to the navigation unit 102 over the wireless communication link 108. In one implementation of such an embodiment, when the navigation unit 102 determines that the received navigation-related input contains an error (or when some other condition exists), the navigation unit 102 communicates this fact to the portable device 104 (for example, by sending an error message to the portable device 104 over the wireless communication link 108). When the portable device 104 receives such a communication, the portable device 104 informs the user 100 that the navigation-related input contained an error (for example, by displaying a suitable error message on the display 340). In this way, the input processing functionality of the portable device 104 can be simplified.

In other embodiments, input checking is performed both by the portable device 104 prior to communication of the navigation-related input to the navigation unit 102 and by the navigation unit 102 after the navigation-related input is received at the navigation unit 102.

Method 400 also includes using at least a portion of the received navigation-related input in the processing performed by the navigation unit 102 (block 408). For example, where the navigation-related input includes system or other types of commands that modify the operation of the navigation unit 102, the navigation unit 102 carries out the command included in the navigation-related input and modifies the operation of the navigation unit 102 accordingly.

In an embodiment where the navigation unit 102 performs dead reckoning navigation processing and the navigation-related input includes a known starting position of the user 100, the known starting position is used in the dead reckoning navigation processing performed by the navigation unit 102.

In an embodiment where the navigation unit 102 estimates an amount of energy expended by the user 100 in performing some motion such as walking and the navigation-related input includes the weight and age of the user 100, the processing unit 310 uses the weight and age information to estimate the amount of energy expended by the user 100 in performing the motion.

In an embodiment where the navigation-related input includes GPS or TDOA information (for example, a position estimate determined based on GPS signals received at the portable device 104 or a TDOA position estimate), the GPS or TDOA information is used by the processing unit 310, for example, to limit the growth of errors in position and/or motion estimates based on the outputs of the inertial sensors 306.

Figure 5:
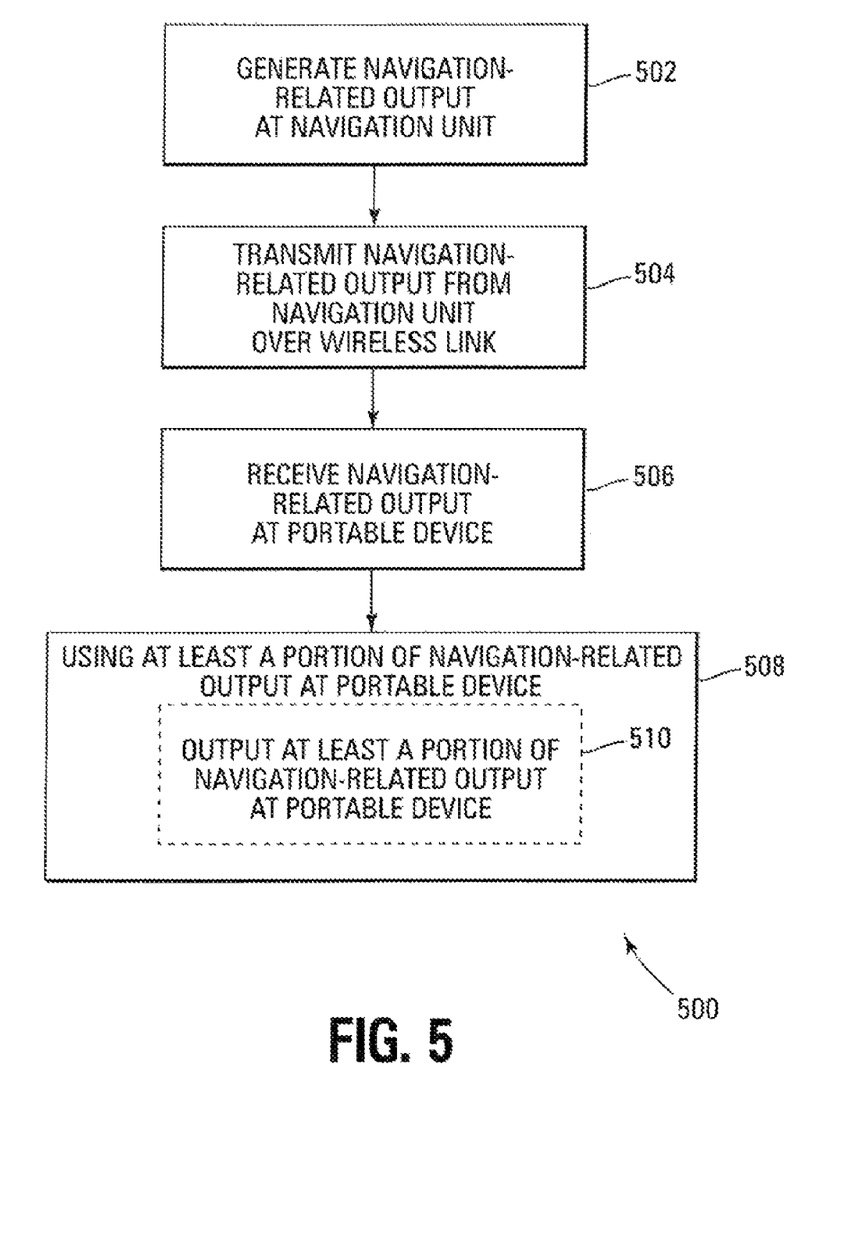
FIG. 5 is a flow diagram of one embodiment of a method of communicating data between a navigation unit and a portable device.

FIG. 5 is a flow diagram of one embodiment of a method 500 of communicating data between a navigation unit and a portable device. The embodiment shown in FIG. 5 is described here as being implemented using the system 101 shown in FIGS. 1-3, though other embodiments are implemented in other ways (for example, using other navigation units and/or portable devices).

Method 500 includes generating output at the navigation unit 102 (block 502). This output is also referred to here as "navigation-related output." In one embodiment, the navigation-related output is generated by the processing unit 310 of the navigation unit 102. In such an embodiment, the processing unit 310 generates the navigation-related output based on, for example, signals output by the sensors 304 and/or the GPS receiver 366 and/or navigation-related input received from the portable unit 104 (for example, a navigation-related input such as a starting position estimate or GPS or TDOA information received from the GPS receiver 364 or TDOA interface 386, respectively, of the portable device 104).

One example of a navigation-related output is a position estimate that is determined by the navigation unit 102 using signals output by one or more of the sensors 304. Another example of navigation-related output is an estimate of an attribute related to motion of the user (for example, the distance traveled, velocity, acceleration, etc.). Examples of such output are described in the '266 Patent. Other examples of navigation-related output include an estimate or measured physiological attribute of the user 100 to which the navigation unit 102 is attached (for example, energy expended, respiration rate, heart rate, hydration level, blood oxygen level). Examples of such physiological output are described in the '931 Application.

Method 500 includes transmitting the navigation-related output from the navigation unit 102 to the portable device 104 over the wireless communication link 108 (block 504). The navigation-related output is received by the portable device 104 (block 506). For example, the navigation-related output is transmitted by the wireless transceiver 322 of the navigation unit 102 to the wireless transceiver 358 of portable device 104 over the wireless communication link 108 using BLUE-TOOTH technology. In other embodiments, other wireless communication technology is used. The transmitted navigation-related output is received by the wireless transceiver 358 in the portable device 104.

The received navigation-related output is used by the portable device 104 (block 508). For example, in one embodiment, the received navigation-related output is supplied to the processing unit 346 of the portable device 104 for use thereby. For example in one implementation (shown in FIG. 5 using dashed lines), the use of the navigation-related output includes outputting at least a portion of the navigation-related output at the portable device 104 for the user 100 (block 510). In one usage scenario, information (for example, a position estimate) included in the navigation-related output is displayed on a display 340 of the portable device 104 for the user 100 to read. In such a usage scenario, the navigation-related output is displayed within a user interface that is otherwise displayed on display 340. Also, in some situations, the navigation-related output is displayed in connection with a prompt or other request for the user 100 to enter some form of input in response to the displayed output.

In another usage scenario, the information included in the navigation-related output is used to generate an audio signal that is played by the speaker 344 included in the output interface 334 of the portable device 104. For example, in one implementation of such an embodiment, information included in the navigation-related output is output in the form of a voice that speaks at least some of the information included (or information that is derived from at least some of) the navigation-related output. In another implementation, a particular audio cue is played on the speaker 342 depending on the content of the navigation-related output (for example, a warning beep may be played if the user 100 has strayed from a particular course or a physiological attribute of the user 100 meets some condition).

In one embodiment, information included in the navigation-related output is formatted or otherwise modified prior to being output by the portable device 104. In one example where the navigation-related output includes a position estimate, the processing unit 346 of the portable device 104 converts the units of measure in which the position estimate is expressed to units that are preferred by the user 100 (for example, from metric units to English/U.S. units).

In another embodiment, the received navigation-related output is used by the portable device 104 as an input for other processing performed by the portable device 104. For example in the usage scenario shown in FIG. 2, the navigation unit 102 and the portable device 104 act as an input device, for example, for a video game or a user interface executing on the portable device 104. The navigation-related output received by the portable device 104 is supplied to the video game or user interface for processing thereby.

The methods and techniques described here may be implemented in digital electronic circuitry, or with a programmable processor (for example, a special-purpose processor or a general-purpose processor such as a microprocessor) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A mobile telephone comprising:
   at least one inertial sensor configured to sense movement of the mobile telephone; and
   at least one programmable processor configured to execute software, the at least one programmable processor communicatively coupled to the inertial sensor;
   wherein the software is configured to use information derived at least in part from data output by the inertial sensor related to the movement of the mobile telephone as an input to a user interface implemented by the software on the mobile telephone; and
   wherein the software is configured to use the information derived at least in part from the data output by the inertial sensor in order to recognize at least one gesture.

2. The mobile telephone of claim 1, wherein the inertial sensor comprises at least one of:
   an accelerometer; and
   a gyroscope.

3. The mobile telephone of claim 1, wherein the information derived at least in part from the data output by the inertial sensor related to the movement of the mobile telephone comprises information indicative of at least one of an attitude of the mobile telephone, a velocity of the mobile telephone, and an acceleration of the mobile telephone.

4. The mobile telephone of claim 1, wherein the inertial sensor is attached to the mobile telephone.

5. The mobile telephone of claim 1 further comprising at least one of: a display, a speaker, a key pad, a microphone, and a touch screen.

6. The mobile telephone of claim 1, wherein the software is configured to recognize a finite number of gestures.

7. The mobile telephone of claim 1, wherein the software comprises a video game.

8. The mobile telephone of claim 1, wherein the software is configured to receive an input related to moving the mobile telephone to simulate a movement of at least one of a pointing device, a joystick, and a steering wheel of an automobile.

9. The mobile telephone of claim 1 further comprising at least one of a magnetic sensor, a barometric pressure sensor, a radio frequency sensor, a physiological sensor, a global position system receiver, a time difference of arrival interface, and a time of arrival interface.

10. A method comprising:
    sensing movement of a mobile telephone at least in part using an inertial sensor;
    providing information derived at least in part from sensor data output by the inertial sensor to at least one programmable processor included in the mobile telephone; and
    using at least some of the information provided to the programmable processor as an input to software executing on the programmable processor included in the mobile telephone;
    using the information derived at least in part from the data output by the inertial sensor as an input to a user interface implemented by the software on the mobile telephone; and
    using the information derived at least in part from the sensor data output by the inertial sensor to recognize at least one gesture.

11. The method of claim 10, wherein the inertial sensor comprises at least one of:
    an accelerometer; and
    a gyroscope.

12. The method of claim 10, wherein information derived at least in part from the sensor data output by the inertial sensor comprises information indicative of at least one of an attitude of the mobile telephone, a velocity of the mobile telephone, and an acceleration of the mobile telephone.

13. The method of claim 10, wherein a finite number of gestures are recognized using the information derived at least in part from the data output by the inertial sensor.

14. The method of claim 10, wherein the software comprises a video game.

15. A program product for use with a mobile telephone having an inertial sensor attached thereto, the program product comprising a non-transitory processor-readable medium on which program instructions are embodied, wherein the program instructions are operable, when executed by at least one programmable processor included in the mobile telephone, to cause the mobile telephone to:
    obtain information derived from sensor data output by the inertial sensor;
    use at least some of the information derived from the sensor data output by the inertial sensor as an input for the program product;
    use the information derived at least in part from the data output by the inertial sensor as an input to a user interface on the mobile telephone; use the information derived at least in part from the data output by the inertial sensor in order to recognize at least one gesture.

16. The program product of claim 15, wherein the information derived from the sensor data output by the inertial sensor is indicative of at least one of an attitude of the mobile telephone, a velocity of the mobile telephone, and an acceleration of the mobile telephone.

17. The program product of claim 15, wherein the program instructions comprise a video game.

18. The program product of claim 15, wherein the program instructions are operable, when executed by at least one programmable processor included in the mobile telephone, to cause the mobile telephone to use the information derived at least in part from the data output by the inertial sensor in order to recognize a finite number of gestures.

19. A mobile telephone comprising:
    at least one inertial sensor configured to sense movement of the mobile telephone; and
    at least one programmable processor configured to execute software, the at least one programmable processor communicatively coupled to the inertial sensor;
    wherein the software is configured to use information derived at least in part from data output by the inertial sensor related to the movement of the mobile telephone as an input to a user interface implemented by the software on the mobile telephone; and
    wherein the software is configured to use an input related to moving the mobile telephone as a movement of a joystick.

20. A method comprising:
    sensing movement of a mobile telephone at least in part using an inertial sensor;
    providing information derived at least in part from sensor data output by the inertial sensor to at least one programmable processor included in the mobile telephone; and
    using at least some of the information provided to the programmable processor as an input to software executing on the programmable processor included in the mobile telephone;
    using the information derived at least in part from the data output by the inertial sensor as an input to a user interface implemented by the software on the mobile telephone;

wherein the software is configured to use an input related to moving the mobile telephone as a movement of a joystick.

21. A program product for use with a mobile telephone having an inertial sensor attached thereto, the program product comprising a non-transitory processor-readable medium on which program instructions are embodied, wherein the program instructions are operable, when executed by at least one programmable processor included in the mobile telephone, to cause the mobile telephone to:

obtain information derived from sensor data output by the inertial sensor;

use at least some of the information derived from the sensor data output by the inertial sensor as an input for the program product; and use the information derived at least in part from the data output by the inertial sensor as an input to a user interface on the mobile telephone;

wherein the program instructions are configured to use an input related to moving the mobile telephone as a movement of a joystick.

* * * * *